United States Patent
Orimo et al.

[11] Patent Number: 5,817,408
[45] Date of Patent: Oct. 6, 1998

[54] SOUND INSULATION STRUCTURE

[75] Inventors: Motohiro Orimo; Kyoichi Watanabe; Kouichi Nemoto; Hiroshi Sugawara, all of Kanagawa; Shousuke Oku, Penang, all of Japan

[73] Assignees: Nissan Motor Co., Ltd., Yokohama; Kasai Kogyo Co., Ltd., Tokyo, both of Japan

[21] Appl. No.: 935,730

[22] Filed: Sep. 23, 1997

[30] Foreign Application Priority Data

Sep. 25, 1996  [JP]  Japan ................................. 8-253124

[51] Int. Cl.⁶ ....................................................... B32B 7/02
[52] U.S. Cl. ......................... 428/218; 181/284; 181/294; 296/39.3; 296/37.12; 442/320; 442/370; 442/396; 442/399
[58] Field of Search ............................. 428/218; 442/370, 442/396, 399, 320; 181/284, 294; 296/39.3, 37.12

[56] References Cited

U.S. PATENT DOCUMENTS

| | | | |
|---|---|---|---|
| 4,131,664 | 12/1978 | Flowers et al. | 264/510 |
| 4,594,278 | 6/1986 | Nixon | 428/218 |
| 4,933,225 | 6/1990 | Abe | 428/218 |
| 5,076,631 | 12/1991 | Lord | 428/218 |
| 5,094,318 | 3/1992 | Maeda et al. | 181/290 |
| 5,501,898 | 3/1996 | Fottinger et al. | 428/218 |
| 5,518,806 | 5/1996 | Eder et al. | 428/218 |

FOREIGN PATENT DOCUMENTS 2 151 757   7/1985   United Kingdom .

*Primary Examiner*—James J. Bell
*Attorney, Agent, or Firm*—Foley & Lardner

[57] ABSTRACT

The invention relates to a sound insulating structure including low-density and high-density layers. The low-density layer has first and second fibrous layers and ranges from 0.5 to 1.5 kg/m² in surface density. The first and second fibrous layers are respectively made of first and second thermoplastic synthetic fibers. The first and second fibers respectively have first and second single fiber diameters, each of which diameters is in a range of from 3 to 40 μm, and first and second fiber lengths, each of which lengths is in a range of from 10 to 100 mm. The high-density layer is formed on the low-density layer and is made of an air-impermeable polymer material and has a surface density that is higher than that of the low-density layer and ranges from 1 to 10 kg/m². The low-density layer is high in sound-absorption coefficient and at the same time low in spring constant. Therefore, the sound insulating structure becomes substantially improved in sound insulating capability.

14 Claims, 1 Drawing Sheet

SOUND INSULATION STRUCTURE

The contents of Japanese Patent Application No. 8253124, with a filing date of Sept. 25, 1996, are hereby incorporated by reference.

BACKGROUND OF THE INVENTION

The present invention relates in general to a sound insulating structure for reducing a sound impact incident on the structure from outside, and more particularly to a sound insulating structure, which is usable as an insulator for an automotive dash panel, for reducing a sound impact incident on the structure from the dash panel.

As is seen from FIG. 2, a conventional automotive dash-panel insulator 10 is disposed on an inner side of an automotive dash panel 12, which is a bulkhead between passenger compartment and engine bay, for the purpose of preventing noise transmission from the engine bay to the passenger compartment. The dash panel insulator 10 is a laminate of a thin high-density layer 14 and a thick low-density layer 16. The high-density layer 14 is made of a material, such as polyvinyl chloride or synthetic rubber, which is mixed with a filler. The low-density layer 16 is made of a porous material such as felt, foamed polyurethane or nonwoven fabric. The low-density layer 16 serves to absorb noise from engine bay. Furthermore, a combination of the dash panel 12 and the high-density layer 14 provides a double-wall soundproof structure. Recently, a sound-absorbing member has commonly been used for the low-density layer 16. This sound-absorbing member is molded in a manner to be precisely fit to the surface configuration of the dash panel 12. With this, the dash panel insulator is much improved in sound insulating capability. Such sound-absorbing member is prepared, for example, by adding binder fibers to synthetic or natural matrix fibers and then by pressing the resultant mixture into a certain shape. The binder fibers may be made of a thermoplastic resin (e.g., polyethylene resin, polypropylene resin, polyester resin and polyurethane resin) or a thermosetting resin (e.g., phenol resin). There is a recent demand for a sound insulating structure, such as automotive dash-panel insulator, that is substantially improved in sound insulating capability.

SUMMARY OF THE INVENTION

It is therefore an object of the present invention to provide a sound insulating structure that is improved in sound insulating capability.

It is a more specific object of the present invention to provide a sound insulating structure that is a laminate of high-density and low-density layers, which low-density layer is superior in sound insulating capability.

According to the present invention, there is provided a sound insulating structure comprising low-density and high-density layers. The low-density layer has first and second fibrous layers and ranges from 0.5 to 1.5 kg/m$^2$ in surface density. The first and second fibrous layers are respectively made of first and second thermoplastic synthetic fibers. These first and second fibers respectively have first and second single fiber diameters, each of which diameters is in a range of from 3 to 40 $\mu$m, and first and second fiber lengths, each of which lengths is in a range of from 10 to 100 mm. The high-density layer of the sound insulating structure is formed on the low-density layer. The high-density layer has a surface density that is higher than that of the low-density layer and ranges from 1 to 10 kg/m$^2$. The high-density layer is made of an air-impermeable polymer material.

According to the present invention, the low-density layer becomes high in sound-absorption coefficient and at the same time low in spring constant. With this, the sound insulating structure becomes substantially improved in sound insulating capability.

DESCRIPTION OF THE PREFERRED EMBODIMENTS

Figure 1:
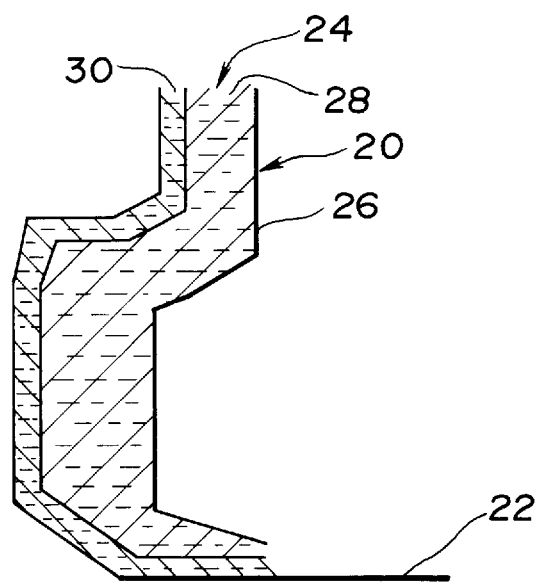
FIG. 1 is an enlarged side sectional view showing a sound insulating structure according to the present invention, formed on an automotive dash panel.
Figure 2:
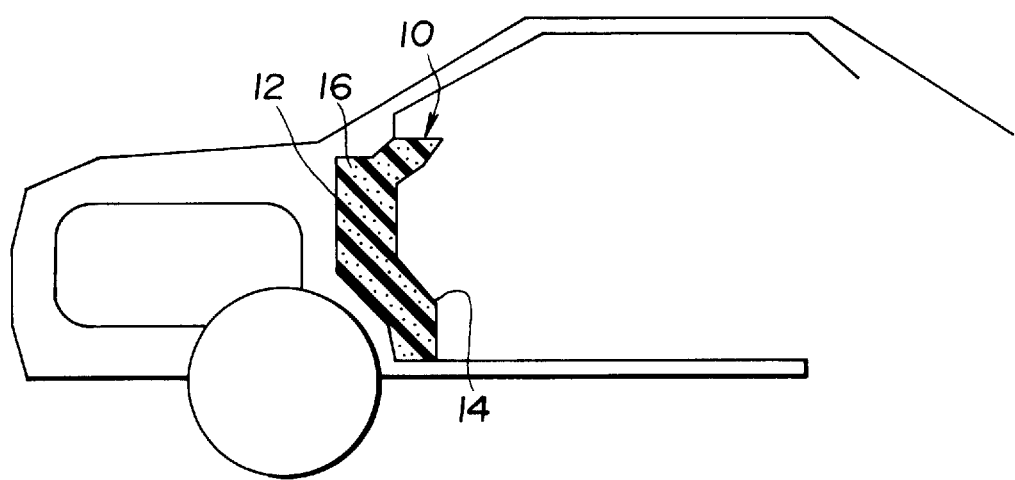
FIG. 2 is a schematic side sectional view showing a conventional dash panel insulator formed on an automotive dash panel.

As is seen from FIG. 1, there is provided a sound insulating structure 20 according to the present invention, which will be described in detail in the following. This sound insulating structure 20 can be formed on the inner side of an automotive dash panel 22, which is a bulkhead between passenger compartment and engine bay (see FIG. 2). The sound insulating structure 20 serves to prevent noise transmission from engine bay to passenger compartment. Hereinafter, the sound insulating structure 20 will also be referred to as a dash panel insulator. As stated above, the sound insulating structure 20 has a low-density layer 24 and a high-density layer 26. These layers constitute a sound-insulating integral laminate and are molded in a manner to conform to the surface configuration of the dash panel 22, as illustrated. The low-density layer 24 has at least two fibrous layers such as first and second fibrous layers 28, 30. As clarified hereinafter, according to the present invention, for example, the kind and the amount of fibers constituting each of the first and second fibrous layers 28, 30 are respectively particularly specified. Thus, the sound insulating structure 20 becomes substantially improved in sound insulating capability.

In general, the sound insulating capability of a common sound insulating structure, which is a laminate of high-density and low-density layers, can be evaluated by the low-density layer's sound absorption coefficient and vibration transmissibity. Firstly, the low-density layer is improved in sound insulating capability by increasing its sound absorption coefficient. This sound absorption coefficient can effectively be increased, for example, by increasing the surface density of the low-density layer and by decreasing the average fineness of the constituent fibers of the low-density layer. However, the increase of the surface density may be limited, for example, in the view of the aim of producing a lightweight automobile. Furthermore, the constituent fibers of the low-density layer become higher in price by decreasing their fineness. Thus, the decrease of the average fineness may also be limited in view of the aim of lowering the production cost. Secondly, the low-density layer is improved in sound insulating capability by decreasing its vibration transmissibity. Vibration transmissibity of an object depends largely on kinetic spring constant of the object. In other words, its sound insulating capability is improved by decreasing its kinetic spring constant (hereinafter referred to as just "spring constant", too). Thus, the low-density layer of a common sound insulating structure becomes superior in sound insulating capability, if it is high in sound-absorption coefficient and at the same time low in spring constant. However, to increase the sound-absorption coefficient of an object and to decrease the spring constant of the object are antagonistic with each other. In other words, it is difficult in general to obtain an object that is high in sound-absorption coefficient and at the same time low in spring constant. In view of this difficulty, according to the present invention, the low-density layer of the sound insulating structure is formed of at least two fibrous layers. In the invention, one of these fibrous layers, that is, the first fibrous layer 28, is formed so as to be high in sound-absorption coefficient, and another of these fibrous layers, that is the second fibrous layer 30, is formed so as to be low in spring constant. Thus, a sound insulating structure of the present invention becomes unexpectedly superior to a great extent in sound insulating capability by cooperative actions between the first and second fibrous layers 28, 30. In fact, the low-density layer 24 is sufficiently increased in sound-absorption coefficient by the first fibrous layer 28, which is the thickest of the at least two fibrous layers of the low-density layer in thickness, and is sufficiently decreased in spring constant by the second fibrous layer 30. Hereinafter, the first and second fibrous layers will respectively be referred to as "sound-absorbing layer" and "low spring-constant layer", too.

In the invention, the low-density layer 24 is a collective body of staples of thermoplastic synthetic fibers, such as nonwoven fabric, which have a single fiber diameter of from 3 to 40 $\mu$m and a fiber length of from 10 to 100 mm. The thermoplastic synthetic fibers used for the low-density layer 24 are preferably linear polyester fibers containing a main component of a general-purpose polyethylene terephthalate from the viewpoints of commercial availability in the market, mechanical strength, elastic characteristics, and cost performance. Other examples of the thermoplastic synthetic fibers are linear polyester fibers containing main components other than polyethylene terephthalate, nylon fibers, polyacrylonitrile fibers, polyacetate fibers, polyethylene fibers and polypropylene fibers. The low-density layer 24, which is sufficient in sound insulating capability, can be obtained at first by preparing staples of thermoplastic synthetic fibers, which staples have the above-mentioned single fiber diameter and fiber length, and then by forming the staples into a nonwoven fabric.

As stated above, the spring constant of the low-density layer depends largely on the fineness of the constituent fibers thereof. The sound insulating capability of the low-density layer varies by changing the spring constant thereof. In most cases, its spring constant decreases by reducing the constituent fibers in fineness. With this, the vibration transmissibity of the low-density layer decreases, and thus the low-density layer is improved in sound insulating capability. As stated above, the staples of the low-density layer have a single fiber diameter of from 3 to 40 $\mu$m. If it is less than 3 $\mu$m, the staples become expensive, thereby to increase the production cost. Furthermore, workability in the step of producing a nonwoven fabric from the staples is lowered. If it is greater than 40 $\mu$m, the low-density layer becomes too high in spring constant. With this, the low-density layer becomes substantially low in sound insulating capability.

In the invention, the low-density layer 24 as a whole has a surface density of from 0.5 to 1.5 kg/m$^2$. If it is less than 0.5 kg/m$^2$, the low-density layer becomes inferior in sound insulating capability. If it is greater than 1.5 kg/m$^2$, the cost of producing the low-density layer becomes too high. Furthermore, the sound insulating structure weighs too much, and the low-density layer becomes too high in spring constant. With this, its vibration transmissibity becomes too high, and thus the low-density layer becomes inferior in sound insulating capability.

The low-density layer's sound absorption characteristics and the like do not largely depend on the fiber length of the constituent fibers of the low-density layer. In the invention, the low-density layer having a sufficient mechanical strength can easily be prepared, if the fiber length of staples of the low-density layer is in a range of from 10 to 100 mm. If it is less than 10 mm, it becomes difficult to produce a nonwoven fabric by a random arrangement of such staples. If it is greater than 100 mm, it becomes difficult to uniformly disperse the staples in the low-density layer. With this, the low-density layer may become inferior in sound insulating capability. Furthermore, it is preferable that the fiber length of staples of the low-density layer is in a range of from 30 to 80 mm, in order to produce a low-density layer that is satisfactory in mechanical strength and has a uniform structure and a good sound absorbing capability and to have a good workability in the production of the low-density layer.

As stated above, the high-density layer 26 formed on the low-density layer 24 is made of an air-impermeable polymer material having a surface density that is higher than that (0.5−1.5 kg/m$^2$) of the low-density layer 24 and ranges from 1 to 10 kg/m$^2$. If the high-density layer is air-permeable, a double-wall structure of the dash panel and the high-density layer becomes insufficient in sound insulating capability. Herein, the air-impermeable polymer material is defined as having an air permeability of up to 0.01 cc/cm$^2$sec, according to Japanese Industrial Standard (JIS) L1004, L1018 and L1096, each of which is incorporated herein by reference in its entirety. Nonlimitative examples of the air-impermeable polymer material are natural and synthetic rubbers and synthetic resins such as polyvinyl chloride. The high-density layer 26 is improved in sound insulating capability by increasing its surface density. However, the increase of the surface density leads to the increase of the weight of the sound insulating structure. If the high-density layer is less than 1 kg/m$^2$ in surface density, it becomes insufficient in sound insulating capability. If it is greater than 10 kg/m$^2$ in surface density, the sound insulating structure becomes too heavy in weight. For instance, this adversely increases the automobile's weight and lowers the workability to fix the dash panel insulator to the dash panel. The surface density of the high-density layer is referably of from 2 to 6 kg/m$^2$, according to a careful consideration of a balance between lowering the sound insulating structure's weight as much as possible and enhancing the sound insulating capability as high as possible.

As mentioned above, the low-density layer is improved in sound insulating capability by decreasing the spring constant of the low-density layer. In the invention, at least one layer (the second fibrous layer 30) of the at least two fibrous layers is formed so as to have a spring constant that is lower than those of the other layers of the at least two fibrous layers, thereby to lower the spring constant of the low-density layer 24 as a whole. It is possible to prepare the second fibrous layer 30 having such spring constant by decreasing the second layer's apparent density so as to be lower than the other layers of the at least two fibrous layers and/or by decreasing the average fineness of second layer's fibers so as to be smaller than those of the other layers thereof. In connection with this, it is very effective to decrease its apparent density and at the same time the average fineness of its fibers.

In a preferred embodiment of the present invention, the thermoplastic synthetic fibers of the first fibrous layer (sound-absorbing layer) 28 are made up of a combination of 45–90 wt% of a fiber A having a single fiber diameter of from 3 to 20 $\mu$m, 5–30 wt% of a fiber B having a single fiber diameter of from 20 to 40 μm, and 5–25 wt% of a fiber C that has a single fiber diameter of from 3 to 20 μm and a softening point that is at least 20° C. lower than the lowest of softening points of the fibers A and B. This sound-absorbing layer 28 provides the low-density layer 24 with sound absorbing capability.

As stated above, the sound-absorbing layer 28 contains a main component of the fiber A. The fiber A has a relatively small fineness, that is, a single fiber diameter of from 3 to 20 μm, and thus improves the sound-absorbing layer in sound-absorbing capability. Due to its relatively small fineness, each single fiber of the fiber A becomes low in rigidity. With this, the fiber A becomes low in spring constant and thus low in vibration transmissibity. Therefore, the sound-absorbing layer is improved in sound insulating capability, due to the inclusion of a large amount (45–90 wt%) of the fiber A. It is not preferable to use thin fibers having a single fiber diameter of less than 3 μm, for the fiber A, because it is not easy to produce such thin fibers. Furthermore, the cost of producing such thin fibers is high, and it becomes difficult to uniformly mix such thin fibers with the fibers B and C. It is not preferable to use thick fibers having a single fiber diameter of greater than 20 μm, for the fiber A, because such thick fibers make the sound-absorbing layer inferior in sound absorbing capacity and increase the sound-absorbing layer in spring constant. Thus, such thick fibers are not preferably used as the fiber A for obtaining a sound-absorbing layer having a good sound-absorbing capacity. It is more preferable that the sound-absorbing layer contains 50–70 wt% of the fiber A having a single fiber diameter of from 5 to 15 μm, in view of a balance between the cost of producing the sound-absorbing layer and the improvement of the sound-absorbing layer in sound absorbing capacity.

As mentioned above, the fiber B has a relatively large fineness, that is, a single fiber diameter of from 20 to 40 μm in and is contained in a relatively small amount (5–30 wt%) in the sound-absorbing layer. Such fiber B provides the sound-absorbing layer with a capability to maintain its original shape. It is preferable to use the fiber B in an amount of at least 5 wt%, in order to maintain the shape of the sound-absorbing layer. If it is less than 5 wt%, the sound-absorbing layer may be deformed due to its insufficient rigidity. Thus, it may become difficult to maintain the sound-absorbing layer to have the original thickness. Furthermore, the fiber B is preferably in an amount of up to 30 wt%. If it is greater than 30 wt%, the sound-absorbing capacity of the sound-absorbing layer may become inferior, although the capacity to maintain its original shape is increased. The fiber B is more preferably in an amount of from 15 to 25 wt%. Furthermore, it is preferable that at least a part of the fiber B is made of hollow fibers each having a cavity at its central portion in an axial direction. Due to the use of hollow fibers, the fiber B is effectively improved in rigidity. Therefore, the sound-absorbing layer is improved in capability to maintain its original shape, even with a small amount of the fiber B. Furthermore, due to the use of hollow fibers, the fiber B is substantially increased in surface area. With this, the sound-absorbing layer is improved in sound-absorbing capacity.

In the invention, the low-density layer 24 has good moldability and can easily be prepared, due to the softening point of the fiber C, which is at least 20° C. lower than the lowest of softening points of the fibers A and B. It is particularly preferable that the low-density layer 24 can be molded in a manner to precisely conform to the surface configuration of a substrate such as automotive dash panel. With this, the low-density layer is precisely fit to the substrate and thus is improved in sound insulating capability. The low-density layer is improved in moldability, due to the use of staples having a relatively short fiber length ranging from 10 to 100 mm as the first and second fibers for preparing the low-density layer. When the low-density layer is molded at a temperature between the softening point of the fiber C and the lowest of softening points of the fibers A and B, only the fiber C is softened. With this, the constituent fibers of the low-density layer are held together by the fiber C serving as an adhesive or binder. Therefore, the low-density layer is improved in capacity to maintain its shape. If the difference between the softening point of the fiber C and the lowest of those of the fibers A and B is less than 20° C., the constituent fibers (fibers A, B and C) of the low-density layer may entirely be softened. With this, the low-density layer may become hard in structure, and thus its sound insulating capability may become inferior. In an extreme case of this, the low-density layer may turn into a plate-like body by a complete melting of the constituent fibers of the low-density layer. Such low-density layer may no longer has a sound insulating capacity.

In the invention, the fiber C has a single fiber diameter of from 3 to 20 μm, as mentioned above. If the single fiber diameter is less than 3 μm, the fiber C becomes too high in price. Furthermore, the fiber C itself may be deformed upon molding, and the low-density layer may become too hard in structure due to that the fiber C is completely softened upon molding. With this, the low-density layer may become too high in spring constant and thus too low in sound insulating capacity. If the single fiber diameter of the fiber C is greater than 20 g m, the number of fibers of the fiber C may become too small. With this, the low-density layer may become inferior in capacity to maintain its original shape.

In the invention, the fiber C contained in the sound-absorbing layer is in an amount of from 5 to 25 wt%. If it is less than 5 wt%, it becomes too small to hold the constituent fibers of the sound-absorbing layer together. With this, the sound-absorbing layer becomes insufficient in capacity for maintaining its original shape. If it is greater than 25 wt%, the sound-absorbing layer becomes too hard in structure. With this, the sound-absorbing layer becomes too low in sound insulating capacity. The amount of the fiber C contained in the sound-absorbing layer is preferably in an amount of from 20 to 25 wt%, in view of the cost performance, the maintenance of the original shape of the sound-absorbing layer, and the improvement of the sound insulating capacity.

In the invention, the fibers A, B and C must be compatible with each other to form the low-density layer. The fibers A and B may be made of the same or different synthetic polymers. In contrast, the material of the fiber C is different from those of the fibers A and B such that its softening point is at least 20° C. lower than the lowest of those of the fibers A and B, as mentioned above. For example, when each of the fibers A and B is a polypropylene fiber, the fiber C may be a polyethylene fiber having the above-specified softening point. Furthermore, when the fibers A and B are respectively made of the same homopolymer or homopolymers that are substantially the same in chemical composition, the fiber C may be a copolymer that is compatible with the fibers A and B and has the above-specified softening point. For example, when each of the fibers A and B is made of polyethylene terephthalate, the fiber C may be made of a copolymer of ethylene terephthalate and ethylene isophthalate. In a preferred example, when each of the fibers A and B is made of a homopolyester, the fiber C is a polyester-based conjugated fiber that has a side-by-side or core-and-sheath type structure and contains one component, that is, the homopolyester and the other component, that is, a copolyester exposed on the surface of the fiber C. When this conjugated fiber is used as the fiber C, the homopolymer (homopolyester) of the fiber C is not softened upon molding and thus serves to maintain the original shape of the fiber C. In contrast, the copolymer (copolyester) of the fiber C is softened upon molding and thus serves as a binder to hold the fibers A, B and C together. In another preferred example, the fiber C is an eccentric-type conjugated fiber containing one and the other component that are bonded together and eccentrically arranged with each other in a transverse section of the fiber. In this example, the eccentric-type fiber becomes crimped by a heat treatment. With this, it becomes possible to suppress the increase of the vibration transmissibity.

In the invention, at least one layer of the low-density layer 24, except the sound-absorbing layer 28, is the above-mentioned low spring-constant layer 30 that is made up of a combination of 80–95 wt% of the fiber A and 5–20 wt% of the fiber C. In the low spring-constant layer 30, the fiber A has a single fiber diameter of from 3 to 20 μm, as mentioned above, and the fiber C has a single fiber diameter of from 3 to 20 μ and a softening point that is at least 20° C. lower than that of the fiber A. The low spring-constant layer 30 is provided to decrease the spring constant of the low-density layer 24. In general, the spring constant of a fibrous layer is decreased by reducing the size of the average diameter of the constituent fibers of this fibrous layer. In fact, the low spring-constant layer 30 is made up of only a combination of the fibers A and C, with an omission of the fiber B having a thicker single fiber diameter (20–40 μm) than those (3–20 μm) of the fibers A and B. Therefore, the average fiber diameter of the constituent fibers of the low spring-constant layer 30 is smaller than that of the constituent fibers of the sound-absorbing layer 28. With this, the spring constant of the low spring-constant layer 30 becomes smaller than that of the sound-absorbing layer 28. Thus, the low spring-constant layer 30 is reduced in vibration transmissibity. The low spring-constant layer hardly needs to have a high fibrous rigidity. Therefore, it is not necessary to add the fiber B to the low spring-constant layer. It is good that the fiber C content of the low spring-constant layer is as low as possible within a range of from 5 to 20 wt%, in order to reduce the spring constant thereof. If it exceeds 20 wt%, the constituent fibers of the lower spring-constant layer are held together with too much strength, thereby to make the spring constant too high. If it is lower than 5 wt%, the number of contact points at which the constituent fibers are held together may become insufficient. With this, the low spring-constant layer may become insufficient in cohesion to hold the constituent fibers together. Thus, the low spring-constant layer may separate from the sound-absorbing layer. The fiber C of the low spring-constant layer is characterized in substantially the same way as that of the sound-absorbing layer.

In the invention, it is preferable that the sound-absorbing layer 28 has a thickness ranging from 80 to 97%, based on the total thickness of the low-density layer 24, and a surface density ranging from 80 to 97%, based on the surface density of the low-density layer. It is good that the low spring-constant layer has a thickness as thin as possible, in view of moldability of the low-density layer. If the amount of the constituent fibers of the low-spring layer is too much, it becomes difficult to cut or punch the low-density layer. If the sound-absorbing layer is less than 80% in thickness, it may become inferior in moldability. In contrast, if it is greater than 97% in thickness, it may become too high in spring constant. If it is less than 80% in surface density, the low spring-constant layer may become too high in spring constant. With this, it may become difficult to reduce the spring constant of the low spring-constant layer. In contrast, if it is greater than 97% in surface density, the low spring-constant layer may become too low in rigidity. With this, the low spring-constant layer may break and thus turn into a plate-like structure. Therefore, it may become difficult to reduce the low spring-constant layer in spring constant.

The following nonlimitative examples are illustrative of the present invention.

EXAMPLE 1

In this example, there was prepared an automotive dash panel insulator 20 having low-density and high-density layers 24, 26. This high-density layer 26 had a surface density of 4.0 kg/m$^2$ and was made of a synthetic rubber. The low-density layer 24 had a sound-absorbing layer 28 and a low-spring layer 30. The sound-absorbing layer 28 was made of a combination of 60 wt% of a fiber A (i.e., polyethylene terephthalate fiber having a single fiber diameter of 14 μm and a fiber length of 50 mm), 20 wt% of a fiber B (i.e., polyethylene terephthalate fiber having a single fiber diameter of 25 μm and a fiber length of 50 mm), and 20 wt% of a fiber C (i.e., a copolymer fiber made from ethylene terephthalate and ethylene isophthalate). The fiber C had a single fiber diameter of 14 μm, a fiber length of 50 mm, and a softening point which was 130° C. lower than that of the fibers A and B. The low-spring layer 30 was made of a combination of 95 wt% of the above fiber A and 5 wt% of the above fiber C. The low-density layer 24 as a whole had a surface density of 1.0 kg/m$^2$. The sound-absorbing layer had a thickness of 95% based on the total thickness of the low-density layer, and a surface density of 90%, based on the surface density of the low-density layer.

EXAMPLE 2

In this example, Example 1 was repeated except in that the amounts of the fibers A and C of the low spring-constant layer were respectively 90 wt% and 10 wt%.

EXAMPLE 3

In this example, Example 1 was repeated except in that the amounts of the fibers A and C of the low spring-constant layer were respectively 85 wt% and 15 wt%.

EXAMPLE 4

In this example, Example 1 was repeated except in that the amounts of the fibers A and C of the low spring-constant layer were respectively 80 wt% and 20 wt%.

EXAMPLE 5

In this example, Example 1 was repeated except in that the sound-absorbing layer had a thickness of 90%, based on the total thickness of the low-density layer.

EXAMPLE 6

In this example, Example 1 was repeated except in that the sound-absorbing layer had a thickness of 85%, based on the total thickness of the low-density layer.

EXAMPLE 7

In this example, Example 1 was repeated except in that the sound-absorbing layer had a thickness of 80%, based on the total thickness of the low-density layer.

EXAMPLE 8

In this example, Example 1 was repeated except in that the sound-absorbing layer had a surface density of 95%, based on the surface density of the low-density layer.

EXAMPLE 9

In this example, Example 1 was repeated except in that the sound-absorbing layer had a surface density of 85%, based on the surface density of the low-density layer.

EXAMPLE 10

In this example, Example 1 was repeated except in that the sound-absorbing layer had a surface density of 80%, based on the surface density of the low-density layer.

EXAMPLE 11

In this example, Example 1 was repeated except in that the fiber C of the low spring-constant layer had a softening point that was 50° C. lower than that of the fiber A.

EXAMPLE 12

In this example, Example 1 was repeated except in that the low-density layer as a whole had a surface density of 0.6 k/m$^2$.

EXAMPLE 13

In this example, Example 1 was repeated except in that the low-density layer as a whole had a surface density of 1.4 kg/m$^2$.

COMPARATIVE EXAMPLE 1

In this comparative example, Example 1 was repeated except in that the amounts of the fibers A and C of the low spring-constant layer were respectively 75 wt% and 25 wt%.

COMPARATIVE EXAMPLE 2

In this comparative example, it was tried to prepare an automotive dash panel insulator in the same way as that of Example 1, except in that the amounts of the fibers A and C of the low spring-constant layer were respectively 99 wt% and 1 wt%. However, it was not possible to cut the low spring constant layer in the trimming step. Due to this, it was not possible to prepare the dash panel insulator. Thus, the after-mentioned evaluation tests were not conducted.

COMPARATIVE EXAMPLE 3

In this comparative example, it was tried to prepare an automotive dash panel insulator in the same way as that of Example 1, except in that the sound-absorbing layer had a thickness of 70%, based on the total thickness of the low-density layer. However, it was not possible to cut the low spring-constant layer in the trimming step. Due to this, it was not possible to prepare the dash panel insulator. Thus, the after-mentioned evaluation tests were not conducted.

COMPARATIVE EXAMPLE 4

In this comparative example, Example 1 was repeated except in that the sound-absorbing layer had a thickness of 99%, based on the total thickness of the low-density layer.

COMPARATIVE EXAMPLE 5

In this comparative example, Example 1 was repeated except in that the sound-absorbing layer had a surface density of 70%, based on the surface density of the low-density layer.

COMPARATIVE EXAMPLE 6

In this comparative example, Example 1 was repeated except in that the sound-absorbing layer had a surface density of 99%, based on the surface density of the low-density layer.

COMPARATIVE EXAMPLE 7

In this comparative example, Example 1 was repeated except in that the low-density layer as a whole had a surface density of 0.3 kg/m$^2$. However, it was not possible to determine the sound insulating capability of the obtained dash panel insulator due to that its sound insulating capability was too low.

COMPARATIVE EXAMPLE 8

In this comparative example, Example 1 was repeated except in that the low-density layer as a whole had a surface density of 2.0 kg/m$^2$. However, the obtained dash panel insulator was judged to be unsuitable as an automotive dash panel insulator, because its weight was too heavy. Thus, the after-mentioned sound insulating capability test was not conducted.

EVALUATION TESTS

The obtained automotive dash-panel insulators prepared in accordance with Examples 1–13 and Comparative Examples 1 and 4–6 were subjected to a spring constant determination test and a sound insulating capability test, and those prepared in accordance with Comparative Examples 7–8 were subjected to only the spring constant determination test.

In the spring constant determination test, each insulator was subjected to a forced vibration. The value of the kinetic spring constant of the insulator was determined by a convergent calculation of a curve obtained by the forced vibration, using a curve fitting method. Furthermore, the value of the kinetic spring constant of only the sound-absorbing layer of each insulator was determined in the same manner as above. When the former and latter values are respectively designated by symbols of x and y, the reduction rate of the kinetic spring constant (R) is expressed in percentages by an equation of $R = [(y-x)/y]100$. The reduction rates calculated by this equation are shown in Table as the results of the spring constant determination test.

In the sound insulating capability test, the sound transmission loss of each insulator was determined, using a sound-source reverberation chamber and a sound-receiving reverberation chamber, in accordance with JIS A 1416 of which disclosure is incorporated herein by reference in its entirety. In this test, a single sound-absorbing layer that is identical with that of each dash panel insulator was prepared per each insulator. The sound transmission loss of this single sound-absorbing layer was set to a standard value of 0 dB. The differences between the sound transmission losses of each insulator and those of the corresponding single sound-absorbing layer were averaged in a low frequency region of less than 500 Hz and in a high frequency region of at least 500 Hz, respectively. The obtained averages are shown in Table as the results of the sound insulating capability test. As shown in Table, it is understood that, for example, the sound insulating capability of the dash panel insulator of Example 1 improved by 2.30 dB in the low frequency region, as compared with that of the corresponding single sound-absorbing layer.

TABLE

| | Spring Const. Reduction Rate (%) | Average Sound Insulating Capability (dB) | |
|---|---|---|---|
| | | in Low Frequency Region (<500 Hz) | in High Frequency Region (500 Hz≦) |
| Example 1 | 35 | 2.30 | 3.6 |
| Example 2 | 31 | 1.95 | 3.0 |
| Example 3 | 25 | 1.69 | 2.6 |
| Example 4 | 22 | 1.50 | 2.3 |
| Example 5 | 37 | 2.34 | 3.6 |
| Example 6 | 40 | 2.67 | 4.1 |
| Example 7 | 45 | 2.86 | 4.4 |
| Example 8 | 36 | 2.41 | 3.7 |
| Example 9 | 38 | 2.40 | 3.6 |
| Example 10 | 38 | 2.34 | 3.7 |
| Example 11 | 38 | 2.41 | 3.7 |
| Example 12 | 34 | 1.30 | 2.0 |
| Example 13 | 36 | 2.60 | 4.0 |
| Com. Ex. 1 | 5 | 0.39 | −0.6 |
| Com. Ex. 4 | −10 | 0.65 | −1.0 |
| Com. Ex. 5 | −3 | −0.20 | −0.3 |
| Com. Ex. 6 | −10 | 0.65 | −1.0 |
| Com. Ex. 7 | 30 | — | — |
| Com. Ex. 8 | 37 | — | — |

What is claimed is:

1. A sound insulating structure comprising:

a low-density layer having first and second fibrous layers and ranging from 0.5 to 1.5 kg/M² in surface density, said first and second fibrous layers being respectively made of first and second thermoplastic synthetic fibers, said first and second fibers respectively having first and second single fiber diameters, each of which diameters is in a range of from 3 to 40 μm, and first and second fiber lengths, each of which lengths is in a range of from 10 to 100 mm; and a high-density layer formed on said low-density layer, said high-density layer having a surface density that is higher than that of said low-density layer and ranges from 1 to 10 kg/m², said high-density layer being made of an air-impermeable polymer material.

2. A structure according to claim 1, wherein said air-impermeable polymer material of said high-density layer is at least one polymer material that has a surface density of from 2 to 6 kg/m² and is selected from the group consisting of natural rubbers, synthetic rubbers and synthetic resins.

3. A structure according to claim 1, wherein each of said first and second fiber lengths is in a range of from 30 to 80 mm.

4. A structure according to claim 1, wherein said first fibrous layer is a sound-absorbing layer that is made of said first thermoplastic synthetic fiber and has a first thickness, a first sound-absorption coefficient, and a first spring-constant, and wherein said second fibrous layer is a low spring-constant layer that is made of said second thermoplastic synthetic fiber and has a second thickness less than said first thickness, a second sound-absorption coefficient less than said first sound-22 absorption coefficient, and a second spring-constant less than said first spring-constant.

5. A structure according to claim 4, wherein said low spring-constant layer has an apparent density that is less than that of said sound-absorbing layer, and wherein said second fiber of said low spring-constant layer has an average fineness that is less than that of said first fiber of said sound-absorbing layer.

6. A structure according to claim 4, wherein said first fiber of said sound-absorbing layer is made up of a combination of 45–90 wt% of a fiber A having a single fiber diameter of from 3 to 20 μm, 5–30 wt% of a fiber B having a single fiber diameter of from 20 to 40 μm and 5–25 wt% of a fiber C that has a single fiber diameter of from 3 to 20 μm and a softening point that is at least 20° C. lower than the lowest of softening points of said fibers A and B, and wherein said second fiber of said low spring-constant layer is made up of a combination of 80–95 wt% of said fiber A and 5–20 wt% of said fiber C.

7. A structure according to claim 6, wherein said first fiber of said sound-absorbing layer is made up of a combination of 50–70 wt% of said fiber A having a single diameter of from 5 to 15 μm, 15–25 wt% of said fiber B, and 20–25 wt% of said fiber C.

8. A structure according to claim 6, wherein said fiber B is a hollow fiber.

9. A structure according to claim 6, wherein said fiber C is a synthetic fiber that is compatible with said fibers A and B.

10. A structure according to claim 9, wherein said fibers A and B are respectively made of homopolymers A and B that are substantially the same in chemical composition, each of said homopolymers A and B is prepared from a monomer, and at least a surface of said fiber C is formed of a copolymer prepared from said monomer and at least one other monomer, said copolymer having a softening point that is lower than those of said homopolymer fibers A and B and being compatible with said homopolymer fibers A and B.

11. A structure according to claim 10, wherein said fiber C is a conjugate fiber made of a combination of said copolymer and a homopolymer having a chemical composition that is substantially the same as those of said homopolymers A and B.

12. A structure according to claim 10, wherein each of said homopolymers A and B is polyethylene terephthalate, and said copolymer is a copolyester prepared from polyethylene terephthalate and said at least one other monomer.

13. A structure according to claim 4, wherein said sound-absorbing layer has a thickness ranging from 80 to 97%, based on a total thickness of said low-density layer, and a surface density ranging from 80 to 97%, based on said surface density of said low-density layer.

14. A structure according to claim 1, which is formed on an inner surface of an automotive dash panel.

* * * * *